US012179488B2

(12) United States Patent
Iwabuchi et al.

(10) Patent No.: US 12,179,488 B2
(45) Date of Patent: Dec. 31, 2024

(54) LIQUID DISCHARGE HEAD AND RECORDING DEVICE

(71) Applicants: KYOCERA CORPORATION, Kyoto (JP); KYOCERA DOCUMENT SOLUTIONS INC., Osaka (JP)

(72) Inventors: Masaru Iwabuchi, Kirishima (JP); Hiroyuki Tomioka, Osaka (JP)

(73) Assignees: KYOCERA CORPORATION, Kyoto (JP); KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 18/477,560

(22) Filed: Sep. 29, 2023

(65) Prior Publication Data

US 2024/0017547 A1 Jan. 18, 2024

Related U.S. Application Data

(62) Division of application No. 17/773,025, filed as application No. PCT/JP2020/040944 on Oct. 30, 2020, now Pat. No. 12,017,454.

(30) Foreign Application Priority Data

Oct. 30, 2019 (JP) ................................ 2019-197862

(51) Int. Cl.
*B41J 2/14* (2006.01)

(52) U.S. Cl.
CPC ....... *B41J 2/14209* (2013.01); *B41J 2/14072* (2013.01); *B41J 2002/14306* (2013.01); *B41J 2202/08* (2013.01)

(58) Field of Classification Search
CPC ................ B41J 2/14209; B41J 2/14072; B41J 2002/14306; B41J 2202/08
See application file for complete search history.

(56) References Cited

U.S. PATENT DOCUMENTS

| | | | |
|---|---|---|---|
| 2005/0122380 A1 | 6/2005 | Nakamura et al. | |
| 2008/0049063 A1 | 2/2008 | Nakamura et al. | |
| 2015/0321474 A1* | 11/2015 | Ichizono | B41J 2/055 347/54 |

FOREIGN PATENT DOCUMENTS

| | | |
|---|---|---|
| CN | 1623787 A | 6/2005 |
| JP | 2011206945 A | 10/2011 |
| JP | 2014223801 A | 12/2014 |
| JP | 2019177638 A | 10/2019 |

* cited by examiner

*Primary Examiner* — Geoffrey S Mruk
(74) *Attorney, Agent, or Firm* — HAUPTMAN HAM, LLP

(57) ABSTRACT

A liquid discharge head includes a flow channel member, a pressurization part, a plurality of discharge holes, a flexible substrate, a cover member, and a heater. The flow channel member includes a first surface and a second surface that is positioned on an opposite side of the first surface. The pressurization part is positioned on the first surface. The plurality of discharge holes are positioned on the second surface. For the flexible substrate, a one-end part thereof that is positioned on the pressurization part is electrically connected to the pressurization part. The cover member covers the one-end part of the flexible substrate. The heater is positioned on the cover member.

12 Claims, 12 Drawing Sheets

LIQUID DISCHARGE HEAD AND RECORDING DEVICE

CROSS-REFERENCE TO RELATED APPLICATION(S)

This application is a divisional application of U.S. patent application Ser. No. 17/773,025 filed on Apr. 28, 2022, which is national stage application of International Application No. PCT/JP2020/040944, filed on Oct. 30, 2020, and which is based upon and claims the benefit of priority to Japanese Patent Application No. 2019-197862, filed on Oct. 30, 2019, the disclosures of which applications are hereby incorporated by reference herein in their entirety.

FIELD

A disclosed embodiment(s) relate(s) to a liquid discharge head and a recording device.

BACKGROUND

An ink-jet printer and/or an ink-jet plotter that utilize(s) an ink-jet recording method has/have been known as a printing device(s). For such a printing device according to an ink-jet method, a liquid discharge head is mounted for discharging a liquid.

For such a liquid discharge head, a heater that elevates a temperature of a liquid is provided through a head body, in order to adjust a viscosity of such a liquid that is discharged from a discharge hole (see, for example, Patent Literature 1).

CITATION LIST

Patent Literature

Patent Literature 1: Japanese Patent Application Publication No. 2014-223801

SUMMARY

A liquid discharge head according to an aspect of an embodiment includes a flow channel member, a pressurization part, a plurality of discharge holes, a flexible substrate, a cover member, and a heater. The flow channel member has a first surface and a second surface that is positioned on an opposite side of the first surface. The pressurization part is positioned on the first surface. The plurality of discharge holes are positioned on the second surface. For the flexible substrate, a one-end part thereof that is positioned on the pressurization part is electrically connected to the pressurization part. The cover member covers the one-end part. The heater is positioned on the cover member.

DESCRIPTION OF EMBODIMENTS

As a heater is positioned away from a discharge hole in a conventional liquid discharge head, it is not possible to transfer heat from such a heater efficiently, so that a variation in a discharge state of a liquid may be caused.

According to a liquid discharge head and a recording device as disclosed in the present application, it is possible to transfer heat from a heater efficiently.

Hereinafter, an embodiment(s) of a liquid discharge head and a recording device as disclosed in the present application will be explained in detail, with reference to the accompanying drawing(s). Additionally, this invention is not limited by each embodiment as illustrated below.

<Configuration of Printer>

Figure 1:
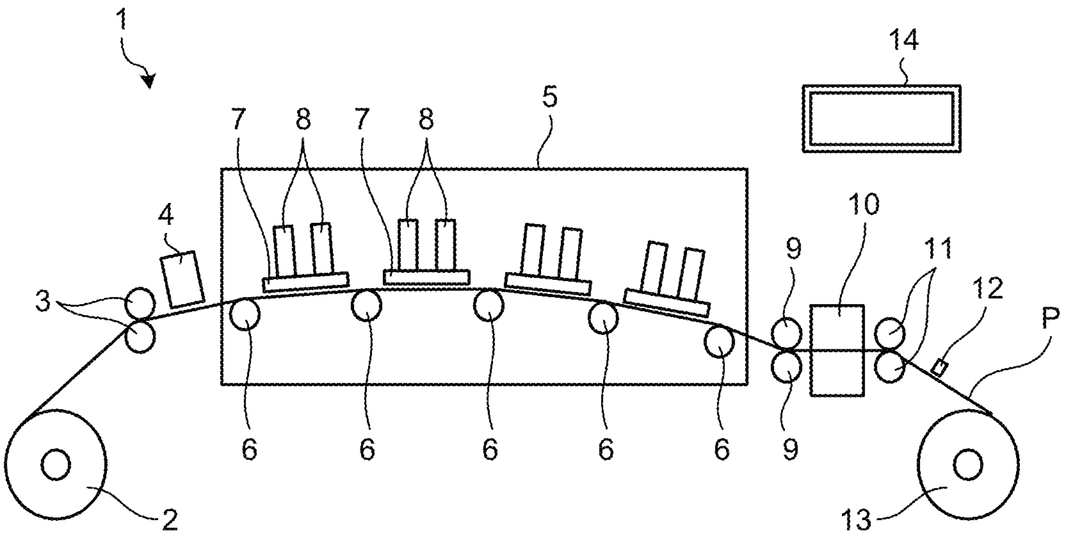
FIG. 1 is an explanatory diagram (part 1) of a recording device according to an embodiment.
Figure 2:
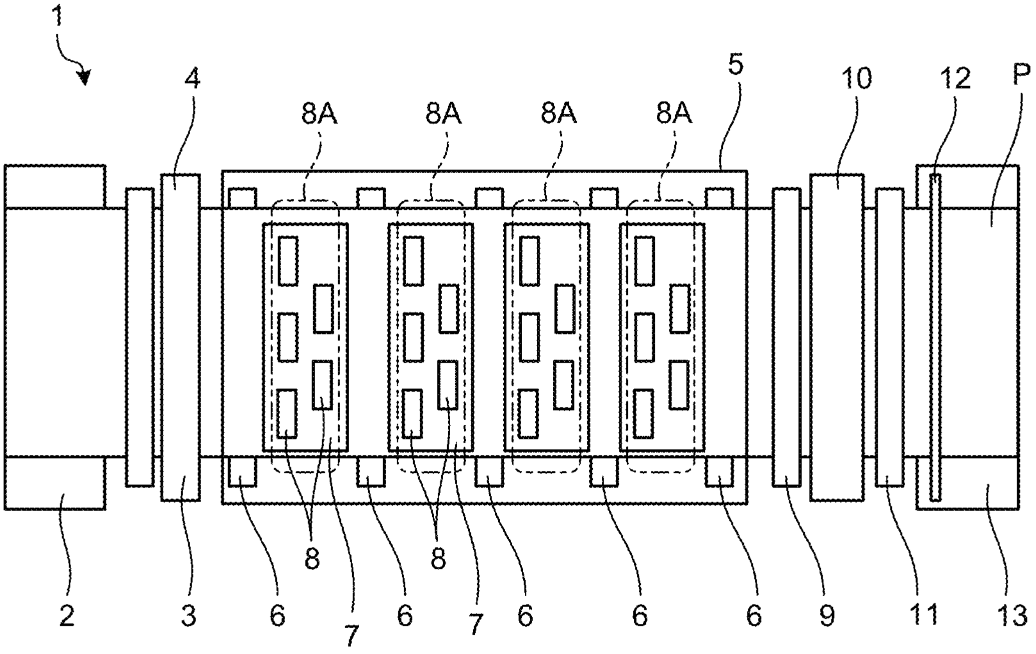
FIG. 2 is an explanatory diagram (part 2) of a recording device according to an embodiment.

First, an outline of a printer 1 that is an example of a recording device according to an embodiment will be explained with reference to FIG. 1 and FIG. 2. FIG. 1 and FIG. 2 are explanatory diagrams of the printer 1 according to an embodiment. Specifically, FIG. 1 is a schematic side view of the printer 1, and FIG. 2 is a schematic plan view of the printer 1. The printer 1 according to an embodiment is, for example, a color ink-jet printer.

As illustrated in FIG. 1, the printer 1 includes a paper feed roller 2, a guide roller(s) 3, an applicator 4, a head case 5, a plurality of conveyance rollers 6, a plurality of frames 7, a plurality of liquid discharge heads 8, a conveyance roller(s) 9, a dryer 10, a conveyance roller(s) 11, a sensor part 12, and a recovery roller 13. A conveyance roller(s) 6 is/are an example(s) of a conveyance part.

Moreover, the printer 1 includes a control part 14 that controls the paper feed roller 2, the guide roller(s) 3, the applicator 4, the head case 5, the plurality of conveyance rollers 6, the plurality of frames 7, the plurality of liquid discharge heads 8, the conveyance roller(s) 9, the dryer 10, the conveyance roller(s) 11, the sensor part 12, and the recovery roller 13.

The printer 1 causes a liquid drop(s) to land on a printing paper P so as to execute recording of an image(s) and/or a character(s) on such a printing paper P. A printing paper P is an example of a recording medium. A printing paper P is provided in a state where it is wound around the paper feed roller 2, before use thereof. Then, the printer 1 conveys a printing paper P from the paper feed roller 2 to an inside of the head case 5 through the guide roller(s) 3 and the applicator 4.

The applicator 4 applies a coating agent to a printing paper P uniformly. Thereby, it is possible to apply surface treatment to a printing paper P, so that it is possible to improve a printing quality of the printer 1.

The head case 5 houses the plurality of conveyance rollers 6, the plurality of frames 7, and the plurality of liquid discharge heads 8. A space that is isolated from an outside is formed inside the head case 5 except that it is linked to an outside at a part such as a part where a printing paper P is input or output.

For an internal space of the head case 5, at least one of control factors such as a temperature, a humidity, and an atmospheric pressure is controlled by the control part 14 as needed. A conveyance roller 6 conveys a printing paper P to a neighborhood of a liquid discharge head 8 inside the head case 5.

A frame 7 is a flat plate with a rectangular shape and is positioned close to an upper side of a printing paper P that is conveyed by the conveyance roller 6. Furthermore, as illustrated in FIG. 2, a frame 7 is positioned in such a manner that a longitudinal direction thereof is orthogonal to a conveyance direction of a printing paper P. Then, a plurality of (for example, four) frames 7 are positioned along a conveyance direction of a printing paper P inside the head case 5.

A liquid, for example, an ink is supplied from a non-illustrated liquid tank to a liquid discharge head 8. A liquid discharge head 8 discharges a liquid that is supplied from such a liquid tank.

The control part 14 controls a liquid discharge head 8 based on data such as an image(s) and/or a character(s), so as to discharge a liquid toward a printing paper P. A distance between a liquid discharge head 8 and a printing paper P is, for example, about 0.5 to 20 mm.

A liquid discharge head 8 is fixed on a frame 7. A liquid discharge head 8 is positioned in such a manner that a longitudinal direction thereof is orthogonal to a conveyance direction of a printing paper P.

That is, the printer 1 according to an embodiment is a so-called line printer where a liquid discharge head(s) 8 is/are fixed inside the printer 1. Additionally, the printer 1 according to an embodiment is not limited to a line printer and may be a so-called serial printer.

A serial printer is a printer of a type that alternately executes a recording operation and conveyance of a printing paper P while moving, such as reciprocating, a liquid discharge head 8 in a direction that intersects with a conveyance direction of a printing paper P, for example, a direction that is substantially orthogonal thereto.

As illustrated in FIG. 2, a plurality of (for example, five) liquid discharge heads 8 are fixed on one frame 7. FIG. 2 illustrates an example where three and two liquid discharge heads 8 are respectively positioned on a front side and a back side in a conveyance direction of a printing paper P, and the liquid discharge heads 8 are positioned in such a manner that centers of respective liquid discharge heads 8 do not coincide in a conveyance direction of a printing paper P.

Then, a head group 8A is composed of a plurality of liquid discharge heads 8 that are positioned on one frame 7. Four head groups 8A are positioned along a conveyance direction of a printing paper P. An ink with an identical color is supplied to liquid discharge heads 8 that belong to an identical head group 8A. Thereby, it is possible for the printer 1 to execute printing based on inks with four colors by using the four head groups 8A.

Colors of inks that are discharged from respective head groups 8A are, for example, magenta (M), yellow (Y), cyan (C), and black (K). The control part 14 controls respective head groups 8A so as to discharge inks with a plurality of colors to a printing paper P, so that it is possible to print a color image(s) on such a printing paper P.

Additionally, in order to execute surface treatment of a printing paper P, a coating agent may be discharged from a liquid discharge head 8 to such a printing paper P.

Furthermore, it is possible to appropriately change a number of a liquid discharge head(s) 8 that is/are included in one head group 8A and/or a number of a head group(s) 8A that is/are mounted on the printer 1, depending on a printing target and/or a printing condition. For example, if a color for printing on a printing paper P is a single color and printing is executed on a printable range by one liquid discharge head 8, a number of a liquid discharge head(s) 8 that is/are mounted in the printer 1 may be one.

A printing paper P where a printing process is executed inside the head case 5 is conveyed to an outside of the head case 5 by the conveyance roller(s) 9 and passes through an inside of the dryer 10. The dryer 10 dries a printing paper P where a printing process is executed. A printing paper P that is dried by the dryer 10 is conveyed by the conveyance roller(s) 11 and is recovered by the recovery roller 13.

In the printer 1, a printing paper P is dried by the dryer 10, so that it is possible to prevent or reduce adhering of printing papers P that overlap and are wounded on the recovery roller 13 to one another and/or rubbing of an undried liquid thereon.

The sensor part 12 is composed of a position sensor, a speed sensor, a temperature sensor, and/or the like. It is possible for the control part 14 to determine a state of each part of the printer 1 based on information from the sensor part 12 and control each part of the printer 1.

Although a case where a printing paper P is used as a printing target (that is, a recording medium) in the printer 1 that is explained thus far is illustrated, a printing target for the printer 1 is not limited to a printing paper P and a fabric with a roll shape and/or the like may be provided as a printing target.

Furthermore, the printer 1 may mount and convey a printing paper P on a conveyance belt instead of directly conveying thereof. It is possible for the printer 1 to provide a flat paper, a cut fabric, a wood, a tile, and/or the like as a printing target(s) by using a conveyance belt.

Furthermore, the printer 1 may print a wiring pattern of an electronic instrument and/or the like so as to discharge a liquid that includes an electrically conductive particle(s) from a liquid discharge head(s) 8. Furthermore, the printer 1 may discharge a predetermined amount(s) of a liquid chemical agent and/or a liquid that includes a chemical agent from a liquid discharge head(s) 8 to a reaction container and/or the like so as to fabricate such a chemical agent.

Furthermore, the printer 1 may include a cleaning part that cleans a liquid discharge head(s) 8. A cleaning part executes cleaning of a liquid discharge head(s) 8 by, for example, a wiping process and/or a capping process.

A wiping process is a process that wipes a surface of a site that discharges a liquid by, for example, a flexible wiper so as to remove a liquid that adheres to a liquid discharge head(s) 8.

Furthermore, a capping process is executed, for example, as follows. First, a cap is applied (where this is referred to as capping) so as to cover a site that discharges a liquid, for example, a second surface 21*b* of a flow channel member 21 (see FIG. 7). Thereby, a substantially sealed space is formed between the second surface 21*b* and a cap.

Then, discharge of a liquid is repeated in such a sealed space. Thereby, it is possible to remove a liquid with a viscosity that is higher than that in a standard state, a foreign substance, and/or the like that plug(s) a discharge hole 163 (see FIG. 7).

First Embodiment

<Configuration of Liquid Discharge Head>

Figure 3:
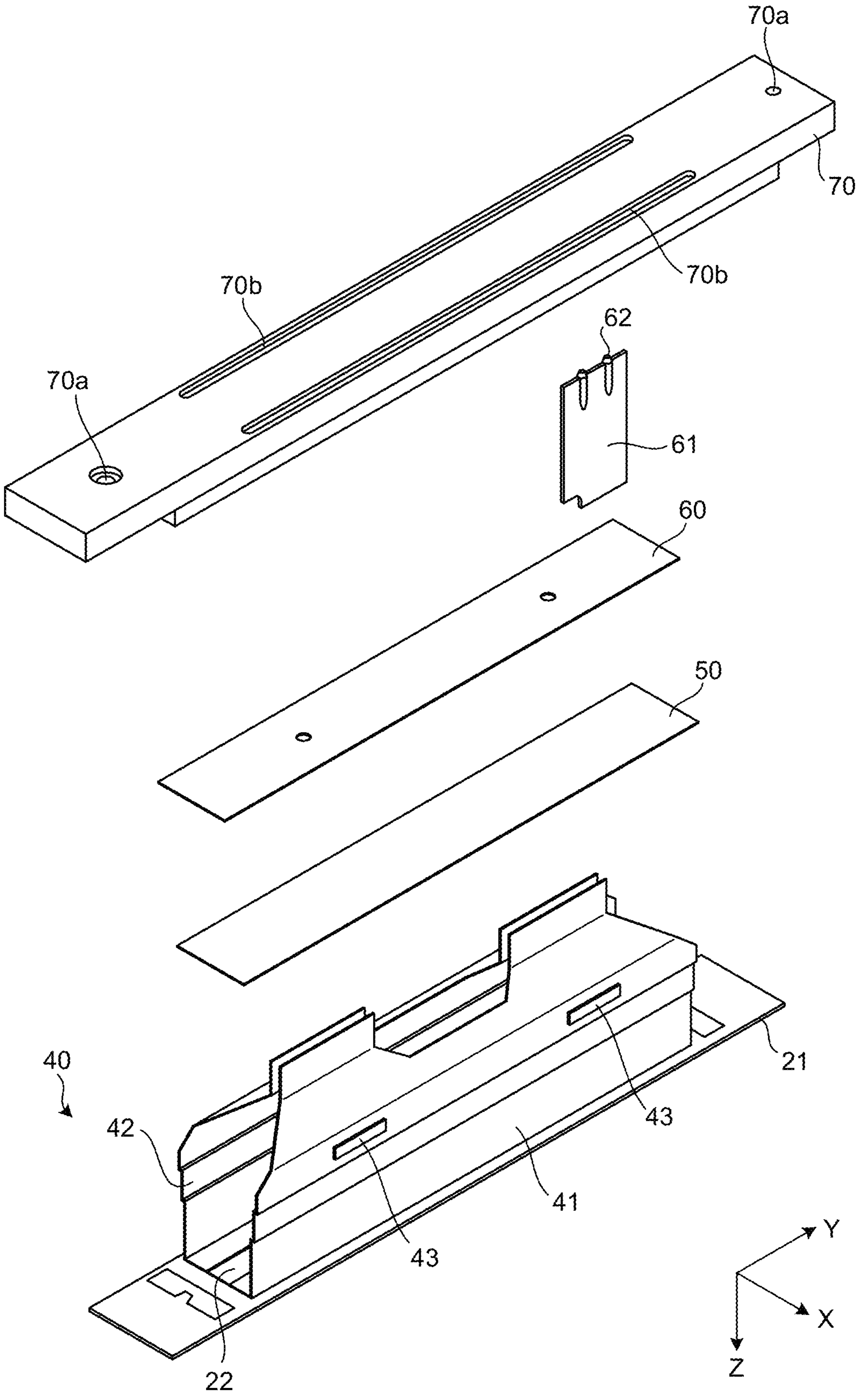
FIG. 3 is an exploded perspective view that illustrates a configuration of an essential part of a liquid discharge head according to a first embodiment.
Figure 4:
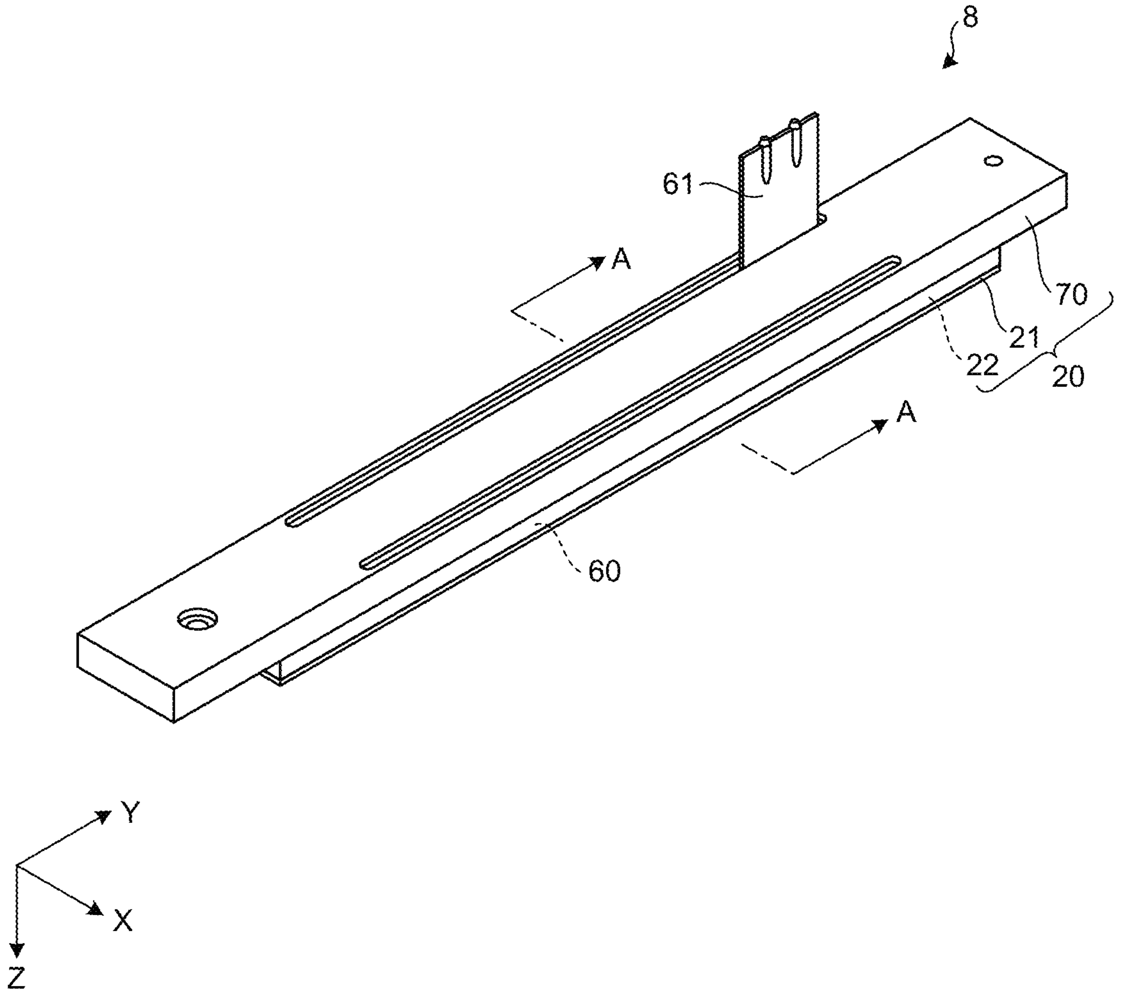
FIG. 4 is a perspective view that illustrates a configuration of an essential part of a liquid discharge head according to a first embodiment.

Next, a configuration of a liquid discharge head 8 according to a first embodiment will be explained with reference to FIG. 3 and FIG. 4. FIG. 3 is an exploded perspective view that illustrates a schematic configuration of the liquid discharge head 8 according to a first embodiment. FIG. 4 is a perspective view that illustrates a configuration of an essential part of the liquid discharge head 8 according to a first embodiment.

The liquid discharge head 8 includes a head body a wiring part 40, a cover member 50, and a heater 60. The head body 20 includes a flow channel member 21, a piezoelectric actuator substrate 22, and a reservoir 70. Furthermore, the wiring part 40 includes flexible substrates 41, 42, and a driving IC(s) 43.

Additionally, FIG. 3 and FIG. 4 illustrate a three-dimensional orthogonal coordinate system that includes a Z-axis where a vertically downward direction is provided as a positive direction and a vertically upward direction is provided as a negative direction, for the sake of clarity of an explanation. Such an orthogonal coordinate system may also be illustrated in another/other drawing(s) that is/are used for an explanation as described later. Furthermore, in an undermentioned explanation, conventionally, a direction where the flow channel member 21 of the head body 20 is provided in the liquid discharge head 8, that is, a side of a positive direction of a Z-axis may be called "downward" and a direction where the reservoir 70 is provided for the flow channel member 21, that is, a side of a negative direction of such a Z-axis may be called "upward". Furthermore, FIG. 3 and FIG. 4 may simplify and illustrate a shape of each member.

The flow channel member 21 is of a substantially flat plate shape and has a first surface 21*a* (see FIG. 7) that is one principal plane and a second surface 21*b* (see FIG. 7) that is positioned on an opposite side of the first surface 21*a*. The first surface 21*a* has an opening(s) 161*a* (see FIG. 5) and a liquid is supplied from the reservoir 70 to an inside of the flow channel member 21 through the opening(s) 161*a*. The reservoir 70 is an example of a supply member.

A plurality of discharge holes 163 (see FIG. 5) that discharge a liquid to a printing paper P are positioned on the second surface 21*b*. Then, a flow channel where a liquid flows from the first surface 21*a* to the second surface 21*b* is formed inside the flow channel member 21.

The piezoelectric actuator substrate 22 is positioned on the first surface 21*a* of the flow channel member 21. The piezoelectric actuator substrate 22 has a plurality of displacement elements 170 (see FIG. 7). A displacement element 170 is an example of a pressurization part. The displacement element(s) 170 is/are positioned on the first surface 21*a* of the flow channel member 21. Additionally, the piezoelectric actuator substrate 22 will be described later by using FIG. 7.

Flexible substrates 41, 42 are electrically connected to the piezoelectric actuator substrate 22. A flexible substrate 41, 42 has a function to transmit a predetermined signal that is sent from an outside to the head body 20. As illustrated in FIG. 3, the liquid discharge head 8 according to an embodiment has two flexible substrates 41, 42. Additionally, FIG. 4 omits illustration of the flexible substrates 41, 42.

A one-end part(s) 41*a*, 42*a* (see FIG. 8) of the flexible substrate(s) 41, 42 is/are positioned on the piezoelectric actuator substrate 22 of the head body 20. The one-end part(s) 41*a*, 42*a* is/are electrically connected to the piezoelectric actuator substrate 22. An another/other-end part(s) of the flexible substrate(s) 41, 42 is/are led upward so as to be inserted through a slit(s) of the reservoir 70 (see FIG. 8) and is/are electrically connected to a non-illustrated wiring substrate.

A driving IC 43 is mounted on each of the flexible substrates 41, 42. The driving IC 43 controls driving of each displacement element 170 in the piezoelectric actuator substrate 22.

As illustrated in FIG. 3, two driving ICs 43 are provided on each of the flexible substrates 41, 42. Additionally, a number of a driving IC(s) 43 that is/are provided on each of the flexible substrates 41, 42 is not limited to two.

The cover member 50 is positioned above the flexible substrates 41, 42. The cover member 50 has a rectangular shape in a plan view and covers the one-end parts 41*a*, 42*a* of the flexible substrates 41, 42 that are positioned on the piezoelectric actuator substrate 22. The cover member 50 covers the one-end parts 41*a*, 42*a* so as to restrict movement of the one-end parts 41*a*, 42*a* in a direction away from the piezoelectric actuator substrate 22. Thereby, in an embodiment, it is possible to reduce a possibility of detaching between the piezoelectric actuator substrate 22 and the flexible substrates 41, 42. The cover member 50 may be positioned so as to pressurize the one-end parts 41*a*, 42*a* against the piezoelectric actuator substrate 22 from above. Furthermore, the cover member 50 may be positioned away from the flexible substrates 41, 42.

It is possible to fabricate the cover member 50 by, for example, a plate-shaped member that is made of a metal(s). Furthermore, the cover member 50 may be formed of a resin(s) or may be formed of an inorganic material(s) such as a ceramic(s). Additionally, an example of arrangement of the cover member 50 will be described later.

The heater 60 is positioned on the cover member and is provided so as to provide a liquid that flows through the head body 20 and is close to a predetermined temperature. The heater 60 and the cover member 50 may be bonded by a non-illustrated adhesive agent, double-sided tape, and/or the like.

As a film heater is used as the heater 60, it is possible to reduce a size thereof in a thickness direction thereof. Furthermore, the heater 60 has a resistance wiring where heat is generated by electrical conduction, in an inside thereof, although illustration thereof is not provided. A resistance wiring of the heater 60 is electrically connected to a heater wiring 61. Although one heater 60 that corresponds to a shape of the cover member is positioned in the liquid discharge head 8 according to an embodiment, this is not limiting and a plurality of heaters 60 may be positioned on the cover member 50.

The heater wiring 61 is led upward so as to be inserted through a slit 70*b* of the reservoir 70, so that it is possible to execute electrical connection between the heater 60 and an outside, through a connector 62 that is positioned on an upper end part of the heater wiring 61. Although the heater wiring 61 is positioned at an end part of the slit 70*b* in a length direction thereof (a direction of a Y-axis) in the liquid discharge head 8 according to an embodiment, this is not limiting and it may be positioned at a central part thereof. Furthermore, they may be positioned on both of slits 70*b* where the flexible substrates 41, 42 are positioned.

Furthermore, one or more thermistors 65 (see FIG. 8) may be provided on such a heater 60. Such a thermistor 65 has a function to detect a temperature(s) of the head body 20 and/or the heater 60 and electrical conduction on the heater 60 is controlled depending on a detected temperature(s).

The reservoir 70 as a supply member is positioned on a side of an opposite surface of the head body 20 and contacts the first surface 21*a* other than the piezoelectric actuator substrate 22. The reservoir 70 has a flow channel in an inside thereof and a liquid is supplied from an outside through an opening(s) 70*a*. The reservoir 70 has a function to supply a liquid to the flow channel member 21 and a function to store a liquid that is supplied.

Additionally, the liquid discharge head 8 may further include a member(s) other than members as illustrated in FIG. 3 and FIG. 4, for example, a housing that houses the wiring part 40, and/or the like.

<Configuration of Head Body>

Figure 5:
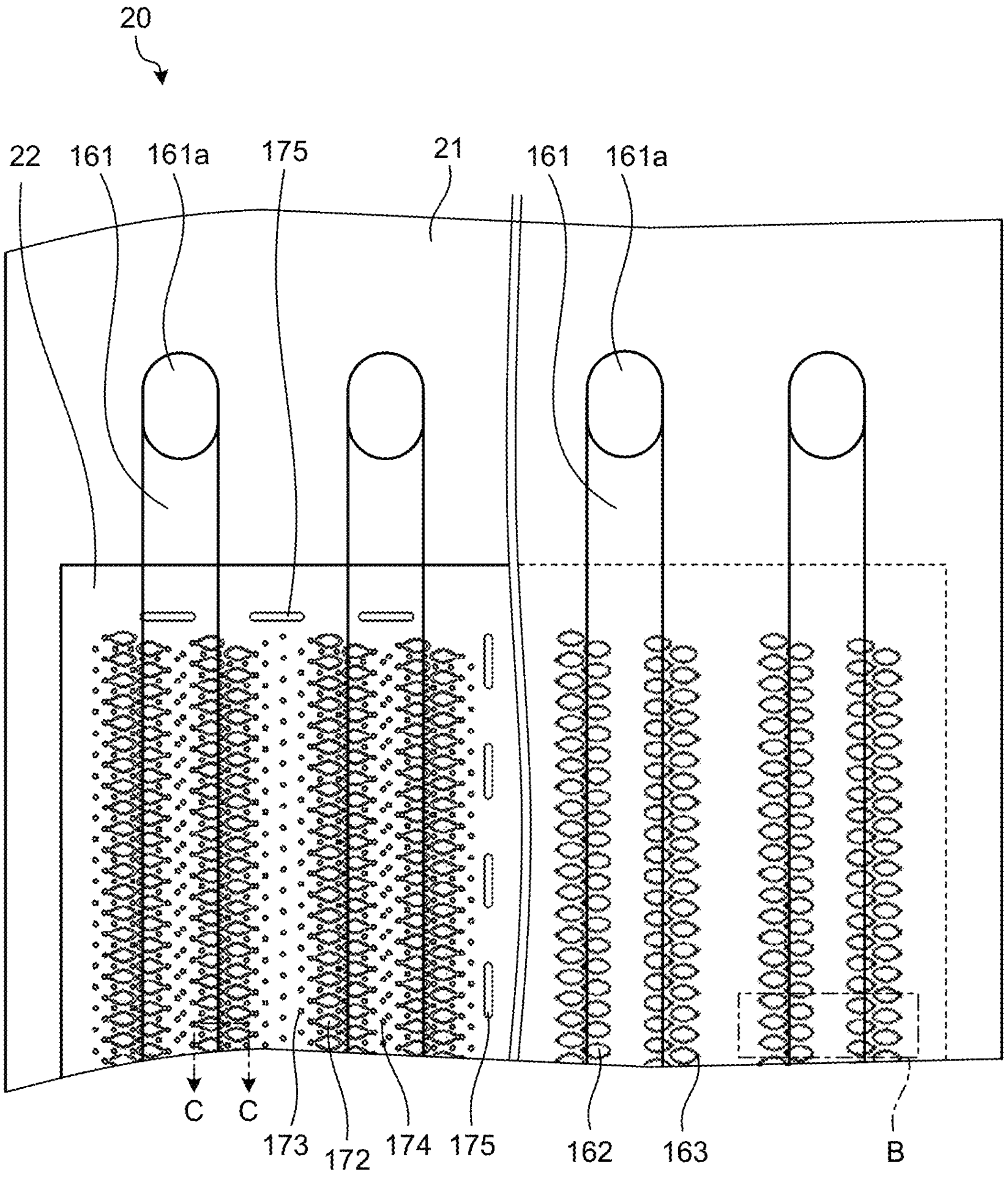
FIG. 5 is an enlarged plan view of a liquid discharge head as illustrated in FIG. 4.
Figure 6:
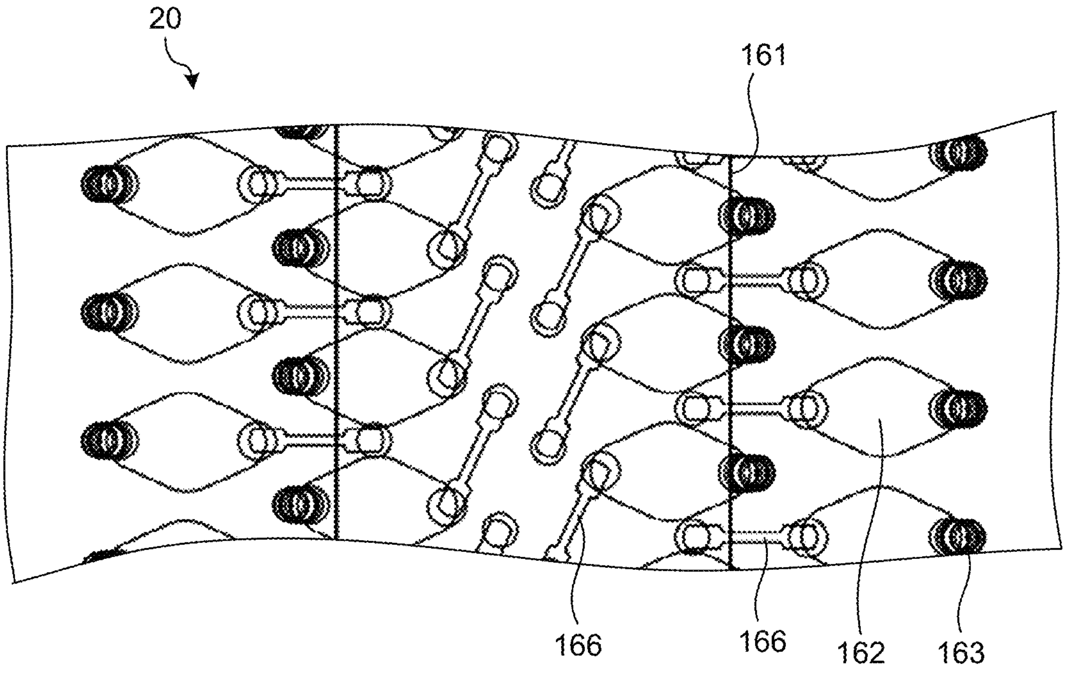
FIG. 6 is an enlarged view of an area B as illustrated in FIG. 5.
Figure 7:
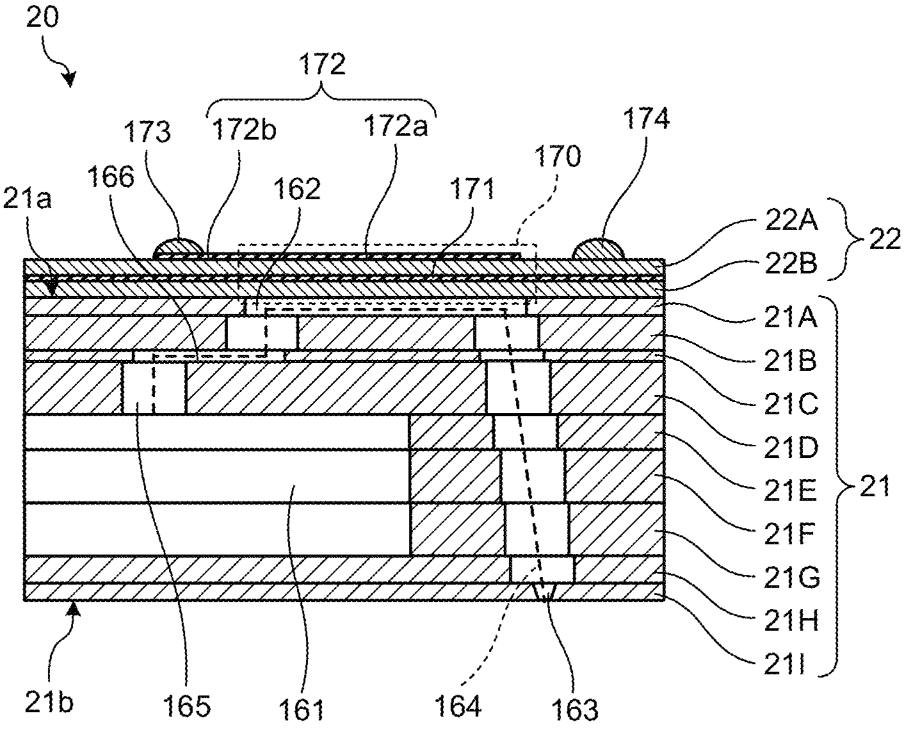
FIG. 7 is a cross-sectional view along line C-C as illustrated in FIG. 5.

Next, a configuration of a head body 20 according to a first embodiment will be explained with reference to FIG. 5 to FIG. 7. FIG. 5 is an enlarged plan view of the head body 20 according to a first embodiment and illustrates an area where a right side area of the figure is transparent. FIG. 6 is an enlarged view of an area B as illustrated in FIG. 5. FIG. 7 is a cross-sectional view along line C-C as illustrated in FIG. 5.

As illustrated in FIG. 5, the head body 20 has a flow channel member 21 and a piezoelectric actuator substrate 22. The flow channel member 21 has a supply manifold(s) 161, a plurality of pressurization chambers 162, and a plurality of discharge holes 163.

The plurality of pressurization chambers 162 are linked to the supply manifold(s) 161. The plurality of discharge holes 163 are linked to the plurality of pressurization chambers 162, respectively.

A pressurization chamber 162 is opened against a first surface 21*a* (see FIG. 7) of the flow channel member 21. Furthermore, the first surface 21*a* of the flow channel member 21 has an opening(s) 161*a* that is/are linked to the supply manifold(s) 161. Then, a liquid is supplied from a reservoir 70 (see FIG. 3) to an inside of the flow channel member 21 through an opening(s) 70*a*.

In an example as illustrated in FIG. 5, the head body 20 has four supply manifolds 161 inside the flow channel member 21. A supply manifold 161 has an elongated shape that extends along a longitudinal direction of the flow channel member 21, and openings 161*a* of the supply manifold 161 are formed on the first surface 21*a* of the flow channel member 21 at both ends thereof.

The plurality of pressurization chambers 162 are formed on the flow channel member 21 so as to extend two-dimensionally. A pressurization chamber 162 is a hollow area that has a planar shape with a substantially diamond shape where a curve(s) is/are applied to a corer part(s) thereof. A pressurization chamber 162 is opened against the first surface 21*a* of the flow channel member 21 and is plugged by joining the piezoelectric actuator substrate 22 to the first surface 21*a*.

The pressurization chambers 162 compose a line of pressurization chambers that are arrayed in a longitudinal direction thereof. The pressurization chambers 162 in a line of pressurization chambers are arranged so as to be staggered between two adjacent lines of pressurization chambers. One group of pressurization chambers is composed of two lines of pressurization chambers that are linked to one supply manifold 161. In an example as illustrated in FIG. 5, the flow channel member 21 has four groups of pressurization chambers.

Furthermore, relative arrangement of the pressurization chambers 162 in each group of pressurization chambers is identical and respective groups of pressurization chambers are positioned so as to be slightly shifted in a longitudinal direction thereof.

A discharge hole(s) 163 is/are arranged at a position(s) that avoid(s) an area that faces the supply manifold(s) 161, on the flow channel member 21. That is, in a case where the flow channel member 21 is transparently viewed from a side of the first surface 21*a*, a discharge hole(s) 163 does/do not overlap with the supply manifold(s) 161.

Moreover, in a plan view, a discharge hole(s) 163 is/are positioned so as to be included in a mounting area of the piezoelectric actuator substrate 22. Such a discharge hole(s) 163 occupies/occupy an area with a size and a shape that are substantially identical to those of the piezoelectric actuator substrate 22, as one group.

Then, a displacement element(s) 170 (see FIG. 7) that is/are a pressurization part(s) of a corresponding piezoelectric actuator substrate 22 is/are displaced so as to discharge a liquid drop(s) from a discharge hole(s) 163.

As illustrated in FIG. 7, the flow channel member 21 has a lamination structure where a plurality of plates are laminated. Such plates are positioned as a cavity plate 21A, a base plate 21B, an aperture (diaphragm) plate 21C, a supply plate 21D, manifold plates 21E, 21F, 21G, a cover plate 21H, and a nozzle plate 21I, in sequence from a side of the first surface 21*a* of the flow channel member 21.

A lot of holes are formed on a plate that composes the flow channel member 21. A thickness of each plate is about 10 μm to 300 μm. Thereby, it is possible to improve formation accuracy of a hole(s). Plates are positioned and laminated in such a manner that such holes are communicated with one another so as to compose a separate flow channel 164 and a supply manifold 161.

In the flow channel member 21, a supply manifold and a discharge hole 163 are linked by the separate flow channel 164. The supply manifold 161 is positioned on a side of a second surface 21*b* inside the flow channel member 21 and a discharge hole 163 is positioned on the second surface 21*b* of the flow channel member 21.

The separate flow channel 164 has a pressurization chamber 162 and a separate supply flow channel 165. A pressurization chamber 162 is positioned on the first surface 21*a* of the flow channel member 21 and the separate supply flow channel 165 is a flow channel that links the supply manifold 161 and the pressurization chamber 162.

Furthermore, the separate supply flow channel 165 includes a diaphragm 166 with a width that is less than that of another part. The diaphragm 166 is provided with a width that is less than that of another part of the separate supply flow channel 165, so that a flow channel resistance thereof is high. When a flow channel resistance of the diaphragm 166 is thus high, a pressure that is produced by a pressurization chamber 162 is not readily reduced to the supply manifold 161.

The piezoelectric actuator substrate 22 includes piezoelectric ceramic layers 22A, 22B, a common electrode 171, a separate electrode 172, a connection electrode 173, a dummy connection electrode 174, and a surface electrode 175 (see FIG. 5).

The piezoelectric actuator substrate 22 is provided in such a manner that a piezoelectric ceramic layer 22B, the common electrode 171, a piezoelectric ceramic layer 22A, and the separate electrode 172 are laminated in this order.

Each of the piezoelectric ceramic layers 22A, 22B has a thickness of about 20 μm. Any layer of the piezoelectric ceramic layers 22A, 22B extends so as to bridge over the plurality of pressurization chambers 162. For the piezoelectric ceramic layers 22A, 22B, it is possible to use a lead zirconate titanate (PZT) type ceramic material(s) that has/have ferroelectricity.

The common electrode 171 is formed over a substantially whole surface in a surface direction in an area between the piezoelectric ceramic layer 22A and the piezoelectric ceramic layer 22B. That is, the common electrode 171 overlaps with all of pressurization chambers 162 in an area that faces the piezoelectric actuator substrate 22. A thickness of the common electrode 171 is about 2 μm. For the common electrode 171, it is possible to use, for example, a metal material such as an Ag—Pd type.

The separate electrode 172 includes a separate electrode body 172*a* and a leading electrode 172*b*. The separate electrode body 172*a* is positioned in an area that faces a pressurization chamber 162 on the piezoelectric ceramic later 22B. The separate electrode body 172*a* is slightly smaller than a pressurization chamber 162 and is provided with a shape that is substantially similar to that of the pressurization chamber 162.

The leading electrode 172*b* is led from the separate electrode body 172*a*. The connection electrode 173 is positioned at a part that is led to an outside of an area that faces a pressurization chamber 162, at one end of the leading electrode 172*b*. For the separate electrode 172, it is possible to use, for example, a metal material such as an Au type.

The connection electrode 173 is positioned on the leading electrode 172*b* and is provided with a thickness of about 15 μm and a protrusive shape. Furthermore, the connection electrode 173 is electrically joined to electrodes that are provided on flexible substrates 41, 42 (see FIG. 3). For the connection electrode 173, it is possible to use, for example, silver-palladium that includes a glass frit.

The dummy connection electrode 174 is positioned on the piezoelectric ceramic layer 22A and is positioned so as not to overlap with a variety of electrodes such as the separate electrode 172. The dummy connection electrode 174 connects the piezoelectric actuator substrate 22 and the flexible substrates 41, 42 so as to improve a connection strength thereof.

Furthermore, the dummy connection electrode 174 homogenizes a distribution of a position of contact between a piezoelectric actuator substrate 22 and a piezoelectric actuator substrate 22 so as to stabilize electrical connection thereof. It is preferable to form the dummy connection electrode 174 by a material equivalent to, and a process equivalent to, those of the connection electrode 173.

The surface electrode 175 is formed at a position that avoids the separate electrode 172, on the piezoelectric ceramic layer 22A. The surface electrode 175 is linked to the common electrode 171 through a via hole that is formed on the piezoelectric ceramic layer 22A. Hence, the surface electrode 175 is grounded so as to be held at a ground electric potential. It is preferable to form the surface electrode 175 by a material equivalent to, and a process equivalent to, those of the separate electrode 172.

A plurality of separate electrodes 172 are each electrically connected to a control part 14 (see FIG. 1) separately, through the flexible substrates 41, 42 and a wiring, in order to control an electric potential separately. Then, as the separate electrode 172 and the common electrode 171 are provided at different electric potentials and electric field is applied in a polarization direction of the piezoelectric ceramic layer 22A, a part where electric field is applied, in such a piezoelectric ceramic layer 22A, is operated as an active part that is distorted by piezoelectric effect.

That is, in the piezoelectric actuator substrate 22, a site that faces a pressurization chamber 162, on the separate electrode 172, the piezoelectric ceramic layer 22A, and the common electrode 171, functions as a displacement element 170. Then, such a displacement element 170 is unimorph-deformed, so that a pressurization chamber 162 is pressurized so as to discharge a liquid from a discharge hole 163.

Subsequently, a driving procedure of a liquid discharge head 8 according to a first embodiment will be explained. First, the separate electrode 172 is preliminarily provided at an electric potential that is higher than that of the common electrode 171 (that will be referred to as a high electric potential below). Then, every time a discharge request is provided, the separate electrode 172 is once provided at an electric potential that is identical to that of the common electrode 171 (that will be referred to as a low electric potential below), and subsequently, is again provided at a high electric potential at a predetermined timing.

Thereby, at a timing when the separate electrode 172 is provided at a low electric potential, the piezoelectric ceramic layers 22A, 22B are returned to original shapes thereof, so that a volume of a pressurization chamber 162 is increased relative to an initial state thereof (a state where electric potentials of both electrodes are different).

Herein, a negative pressure is applied to an inside of a pressurization chamber 162, so that a liquid is sucked from a side of the supply manifold 161 to such an inside of the pressurization chamber 162. Subsequently, at a timing when the separate electrode 172 is again provided at a high electric potential, the piezoelectric ceramic layers 22A, 22B are deformed so as to protrude toward a side of a pressurization chamber 162, so that a pressure in the pressurization chamber 162 is provided as a positive pressure by a decrease in a volume of the pressurization chamber 162.

As a result, a pressure that is provided to a liquid inside a pressurization chamber 162 is increased so as to discharge a liquid drop(s). That is, in order to discharge a liquid drop(s), a driving signal that includes a pulse relative to a high potential that is provided as a reference is supplied to the separate electrode 172.

It is sufficient to provide, as a width of such a pule, an AL (Acoustic Length) that is a length of time when a pressure wave propagates from the diaphragm 166 to a discharge hole 163. Thereby, when an inside of a pressurization chamber 162 is reversed from a negative pressure state to a positive pressure state, both pressures are combined, so that it is possible to discharge a liquid drop(s) at a greater pressure.

Furthermore, in tone printing, tone expression is executed by a number of a liquid drop(s) that is/are continuously discharged from a discharge hole 163, that is, an amount (a volume) of a liquid drop(s) that is/are adjusted by a number of times that a liquid drop(s) is/are discharged. Hence, liquid drop discharge at a number of times that correspond to specified tone expression is continuously executed from a discharge hole 163 that corresponds to a specified dot area.

In general, in a case where liquid discharge is continuously executed, an interval between a pulse and a pulse that are supplied in order to discharge a liquid drop(s) may be provided as an AL. Thereby, cycles of a residual pressure wave of a pressure that is generated when a liquid drop(s) that is/are previously discharged is/are discharged and a pressure wave of a pressure that is generated when a liquid drop(s) that is/are subsequently discharged is/are discharged coincide with one another. Hence, a residual pressure wave and a pressure wave are overlapped, so that it is possible to amplify a pressure for discharging a liquid drop(s). Additionally, in such a case, a speed of a liquid drop(s) that is/are subsequently discharged is increased, so that landing points of a plurality of liquid drops are brought closer.

<Configuration of Essential Part of Liquid Discharge Head>

Figure 8:
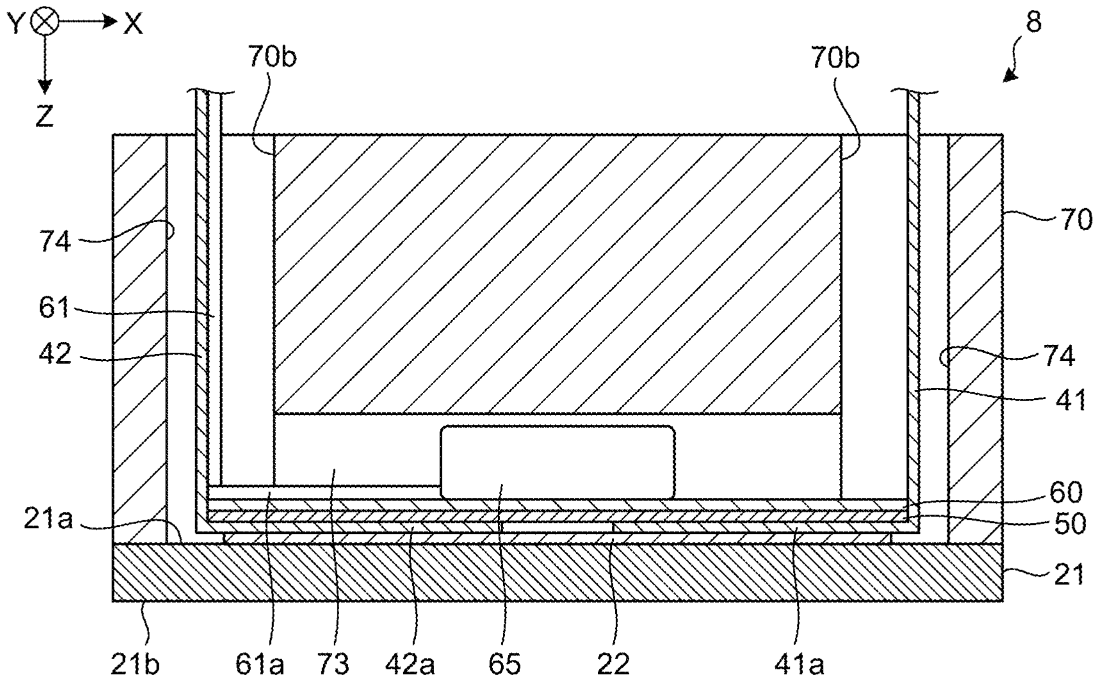
FIG. 8 is an enlarged cross-sectional view along line A-A as illustrated in FIG. 4.

Next, a configuration of an essential part of a liquid discharge head 8 according to an embodiment will be explained with reference to FIG. 8. FIG. 8 is an enlarged cross-sectional view along line A-A as illustrated in FIG. 4.

As illustrated in FIG. 8, a reservoir 70 that is positioned on a first surface 21*a* of a flow channel member 21 has a housing part 73 and a connection part(s) 74. The reservoir 70 has a slit(s) 70*b* that extends along a direction of a Y-axis.

As described above, a piezoelectric actuator substrate 22, one-end parts 41*a*, 42*a* of flexible substrates 41, 42, a cover member 50, a heater 60, and a thermistor 65 are positioned in sequence on the first surface 21*a* of the flow channel member 21. The housing part 73 is a space that houses the piezoelectric actuator substrate 22, the one-end parts 41*a*, 42*a* of the flexible substrates 41, 42, the cover member 50, the heater 60, and the thermistor 65, between it and the first surface 21*a*.

Furthermore, a connection part 74 is an opening that communicates the housing part 73 and a slit 70*b*, and is utilized in order to lead a heater wiring 61 that is connected to the heater 60 and the flexible substrates 41, 42 to an outside of the reservoir 70.

Thus, the reservoir 70 has the housing part 73, so that it is possible to position the heater 60 in a neighborhood of the flow channel member 21. Hence, it is possible to transfer heat from the heater 60 to the flow channel member 21 efficiently, so that a discharge state of a liquid is stabilized. Furthermore, heat from the heater 60 is immediately transferred to the flow channel member 21, so that it is possible to immediately elevate a temperature of a liquid that is positioned at a discharge hole 163 (see FIG. 7) that is positioned on a second surface 21*b* and in a neighborhood thereof, so as to reduce a start-up time of the liquid discharge head 8.

Furthermore, the reservoir 70 has the connection part(s) 74 and the slit(s) 70*b*, so that arrangement of the flexible substrates 41, 42 and/or the heater wiring 61 is facilitated.

Furthermore, as illustrated in FIG. 8, a flexible substrate 42 is led from a slit 70*b* so as to be positioned outside the heater wiring 61. Hence, it is possible for the flexible substrate 42 to play a role of a guide that guides leading of the heater wiring 61 from a slit 70*b*, so as to improve a working efficiency.

Furthermore, a non-illustrated lead wire that is possessed by the thermistor 65 is connected to the heater wiring 61 through a conducting wire 61*a*. Electric power supply to the heater 60 through the heater wiring 61 is controlled depending on a temperature that is detected by the thermistor 65, so that it is possible to hold a temperature of the heater 60 within a predetermined range.

<Arrangement Example of Cover Member>

Figure 9A:
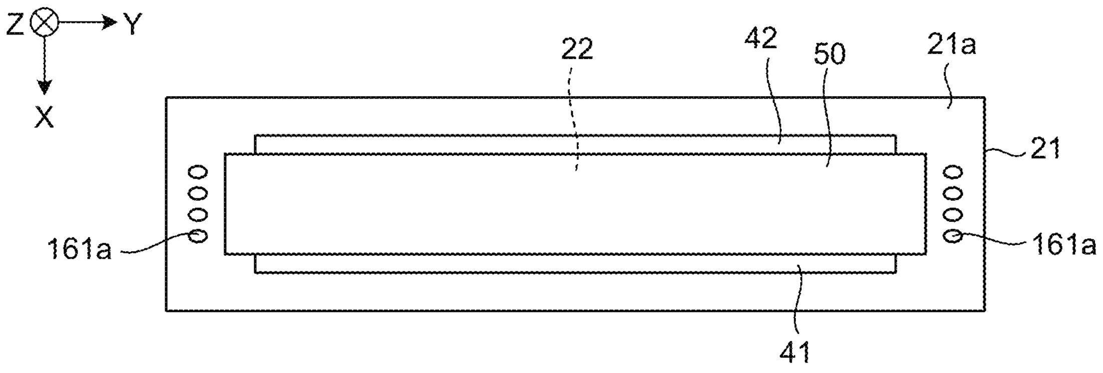
FIG. 9A is an explanatory diagram that illustrates arrangement of a cover member in a head body.
Figure 9B:
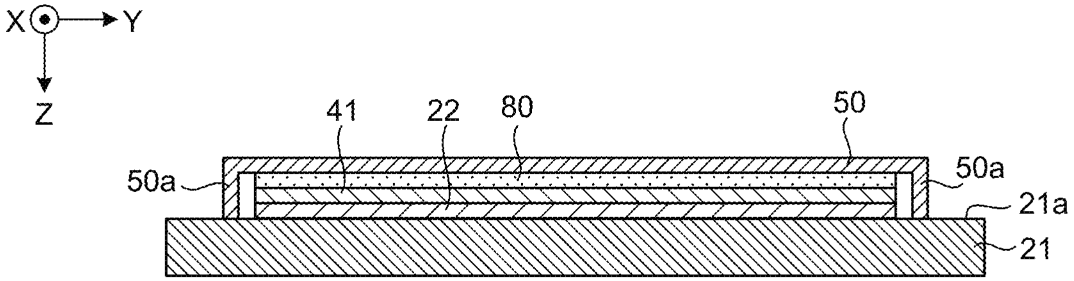
FIG. 9B is an explanatory diagram that illustrates arrangement of a cover member in a head body.

FIG. 9A and FIG. 9B are explanatory diagrams that illustrate arrangement of a cover member in a head body. FIG. 9A is a plan view where a cover member 50 is viewed from a side of a negative direction of a Z-axis and FIG. 9B is a cross-sectional view where a part where a flexible substrate 41 is positioned is cut along a YZ-plane. Additionally, in FIG. 9A and FIG. 9B, illustration of a heater 60 and a thermistor 65 that are positioned on the cover member 50 is omitted.

As illustrated in FIG. 9A, a flow channel member 21 has an opening(s) 161*a* that is/are positioned at both end parts of a first surface 21*a* in a length direction thereof. An opening 161*a* is connected to a flow channel that is possessed by a reservoir 70 in such a manner that a liquid that is supplied from the reservoir 70 is introduced to the flow channel member 21.

Furthermore, as illustrated in FIG. 9B, the cover member 50 contacts the flow channel member 21 by a protrusion part(s) 50*a* that is/are positioned at an end part(s) in a length direction thereof and protrude(s) toward a side of the first surface 21*a*. Heat from the heater 60 that is positioned on the cover member 50 is transferred to the first surface 21*a* of the flow channel member 21 through the protrusion part(s) 50*a*. Hence, it is possible to immediately elevate a temperature of a liquid that is positioned in a neighborhood of the opening(s) 161*a* where a flow of such a liquid is concentrated, so as to reduce a start-up time of a liquid discharge head 8.

Furthermore, the cover member 50 contacts the flow channel member 21 at the protrusion part(s) 50*a* that is/are positioned inside the opening(s) 161*a* where flow channels that are respectively possessed by the reservoir 70 and the flow channel member 21 are connected. Hence, it is possible to immediately elevate a temperature of a liquid that is supplied from the reservoir 70 to the flow channel member 21, so as to reduce a start-up time of the liquid discharge head 8.

Furthermore, as illustrated in FIG. 9B, the cover member 50 is fixed on flexible substrates 41, 42 through an adhesive material 80. The adhesive material 80 is, for example, a double-sided tape or an adhesive agent. Heat from the heater 60 that is positioned on the cover member 50 transfers in order of the cover member 50—the flexible substrates 41, 42→a piezoelectric actuator substrate 22→the flow channel member 21. The cover member 50 and the flexible substrates 41, 42 are fixed, so that an adhesion property between the cover member 50 and the flexible substrates 41, 42 is improved and a property of heat transfer to the flow channel member 21 is improved.

<Variation of Liquid Discharge Head>

Figure 10:
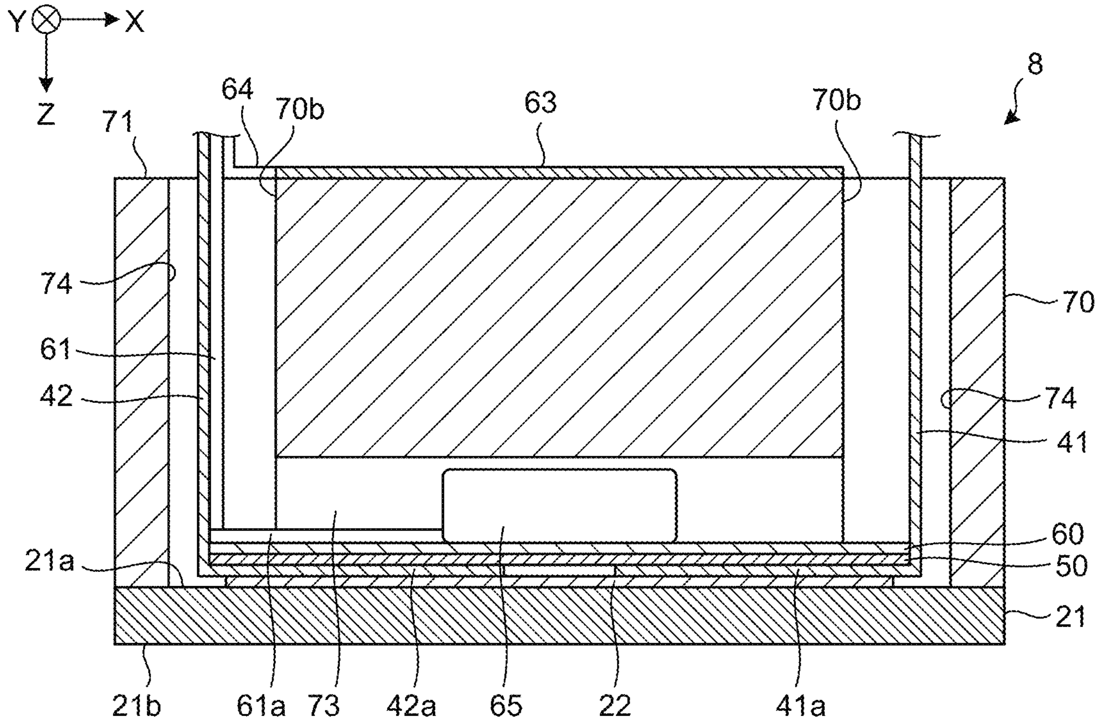
FIG. 10 is a cross-sectional view that illustrates a configuration of an essential part of a liquid discharge head according to a first variation.

FIG. 10 is a cross-sectional view that illustrates a configuration of an essential part of a liquid discharge head according to a first variation. A liquid discharge head 8 as illustrated in FIG. 10 has a configuration that is similar to that of the liquid discharge head 8 as illustrated in FIG. 8 except that it further includes a heater 63 that is positioned on an upper surface 71 of a reservoir 70. Electric power supply to the heater 63 is executed through a heater wiring 64. Thus, the heater 63 is positioned on the reservoir 70, so that it is possible to improve a heat uniformity of a liquid that is positioned inside the liquid discharge head 8. Furthermore, it is possible to elevate a temperature of a liquid in the reservoir 70 immediately.

Figure 11:
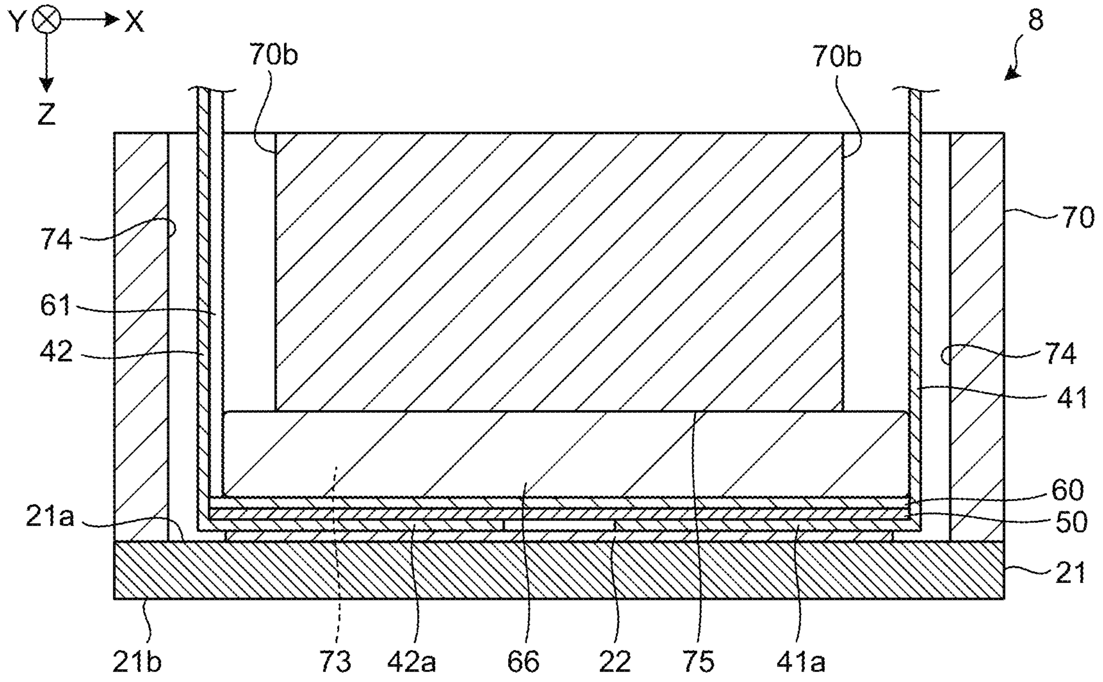
FIG. 11 is a cross-sectional view that illustrates a configuration of an essential part of a liquid discharge head according to a second variation.

FIG. 11 is a cross-sectional view that illustrates a configuration of an essential part of a liquid discharge head according to a second variation. A liquid discharge head 8 as illustrated in FIG. 11 is different from the liquid discharge head 8 as illustrated in FIG. 8 in that a heat conduction sheet 66 is further positioned on a heater 60. The heat conduction sheet 66 is positioned between an upper end 75 of a housing part 73 and the heater 60. The heat conduction sheet 66 transfers heat that is generated by the heater 60 to a reservoir 70. Thus, the heat conduction sheet 66 is positioned on the heater 60, so that it is possible to improve a heat uniformity of a liquid that is positioned inside the liquid discharge head 8. Furthermore, it is possible to elevate a temperature of a liquid in the reservoir 70 immediately.

For the heat conduction sheet 66, it is possible to use, for example, a silicone-based or non-silicone-based heat conduction sheet. The heat conduction sheet 66 may contact, or may separate from, the upper end 75 of the housing part 73. As the heat conduction sheet 66 and the reservoir 70 contacts one another, it is possible to elevate a temperature of a liquid in the reservoir 70 efficiently.

Additionally, the liquid discharge head 8 may have a thermistor 65 (see FIG. 8) although illustration thereof is omitted in FIG. 11. In such a case, the thermistor 65 may be positioned on the heater 60 where the heat conduction sheet 66 is not positioned or may be positioned between the heater 60 and the heat conduction sheet 66. Furthermore, the thermistor 65 may be positioned between the heat conduction sheet 66 and the upper end 75 of the housing part 73. Additionally, the liquid discharge head 8 does not have to have the thermistor 65.

<Variation of Cover Member>

Figure 12:
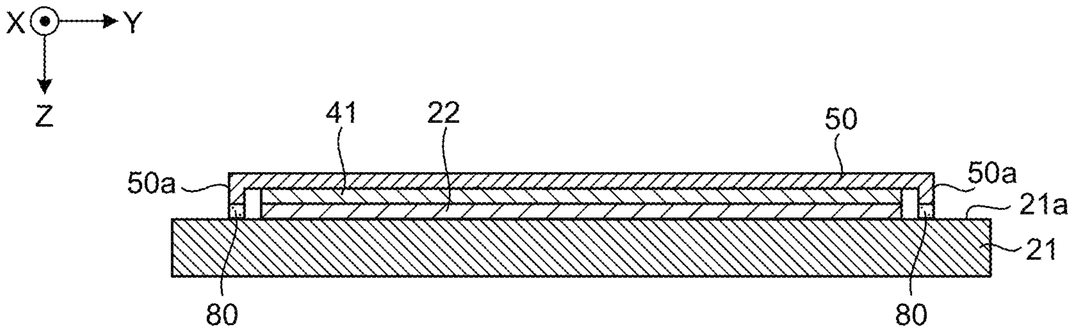
FIG. 12 is an explanatory diagram that illustrates arrangement of a cover member according to a variation.

FIG. 12 is an explanatory diagram that illustrates arrangement of a cover member according to a variation. A cover member 50 as illustrated in FIG. 12 is fixed on a first surface 21*a* of a flow channel member 21 through an adhesive material(s) 80 that is/are disposed on a protrusion part(s) 50*a*. Thus, the cover member 50 and the flow channel member 21 are fixed, so as to improve a heat conductivity from the cover member 50 to the flow channel member 21.

Additionally, in FIG. 12, the cover member 50 and flexible substrates 41, 42 may contact, or may be separated from, one another. As the cover member 50 and the flexible substrates 41, 42 contact one another, it is possible to reduce a possibility of detaching between a piezoelectric actuator substrate 22 and the flexible substrates 41, 42. Furthermore, adhesive materials 80 may be respectively positioned between the cover member 50 and the flexible substrates 41, 42 and between protrusion parts 50*a* and the flow channel member 21, so as to fix a set of the cover member 50 and the flexible substrates 41, 42, and a set of the protrusion parts 50*a* and the flow channel member 21, respectively.

Second Embodiment

Figure 13:
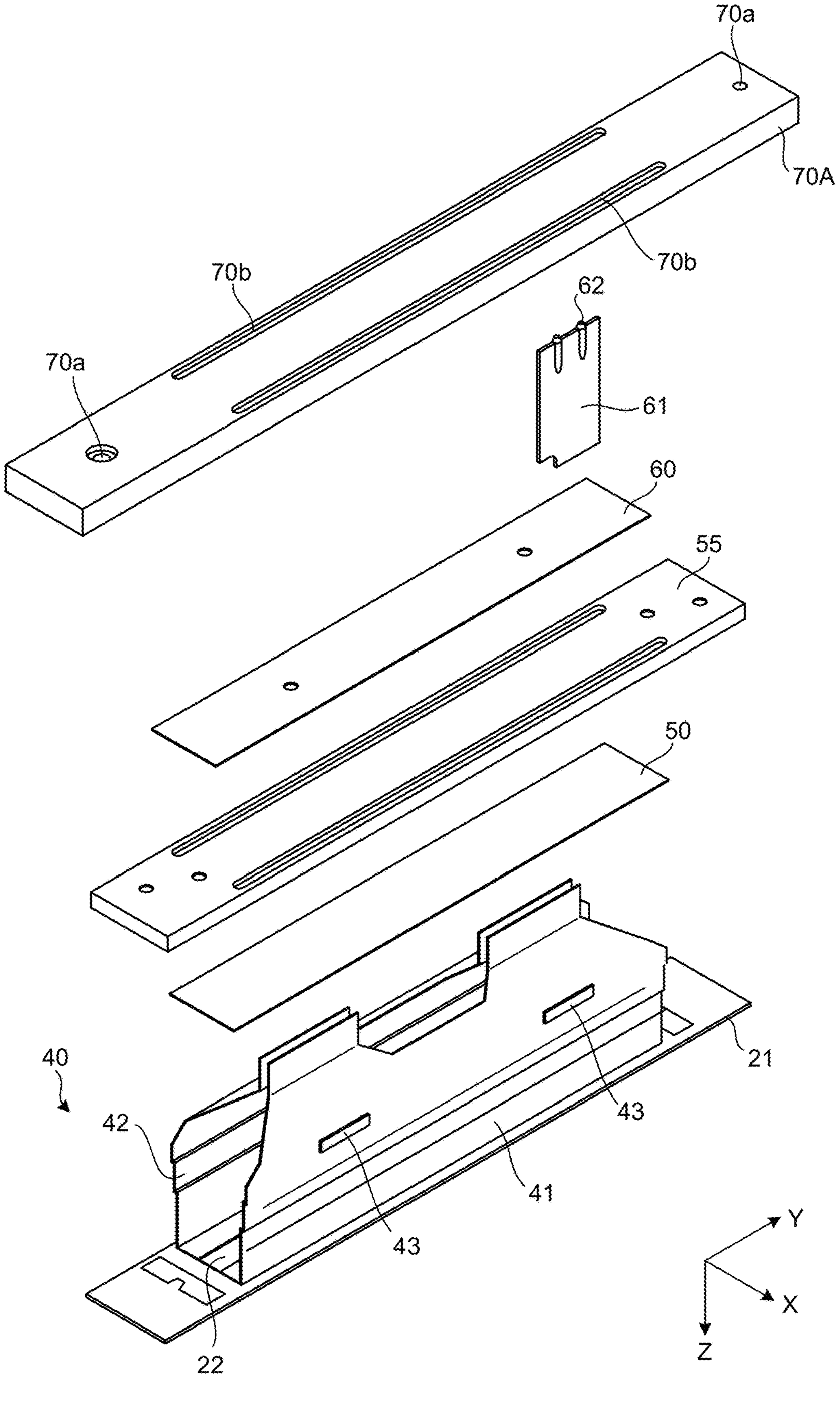
FIG. 13 is an exploded perspective view that illustrates a configuration of an essential part of a liquid discharge head according to a second embodiment.
Figure 14:
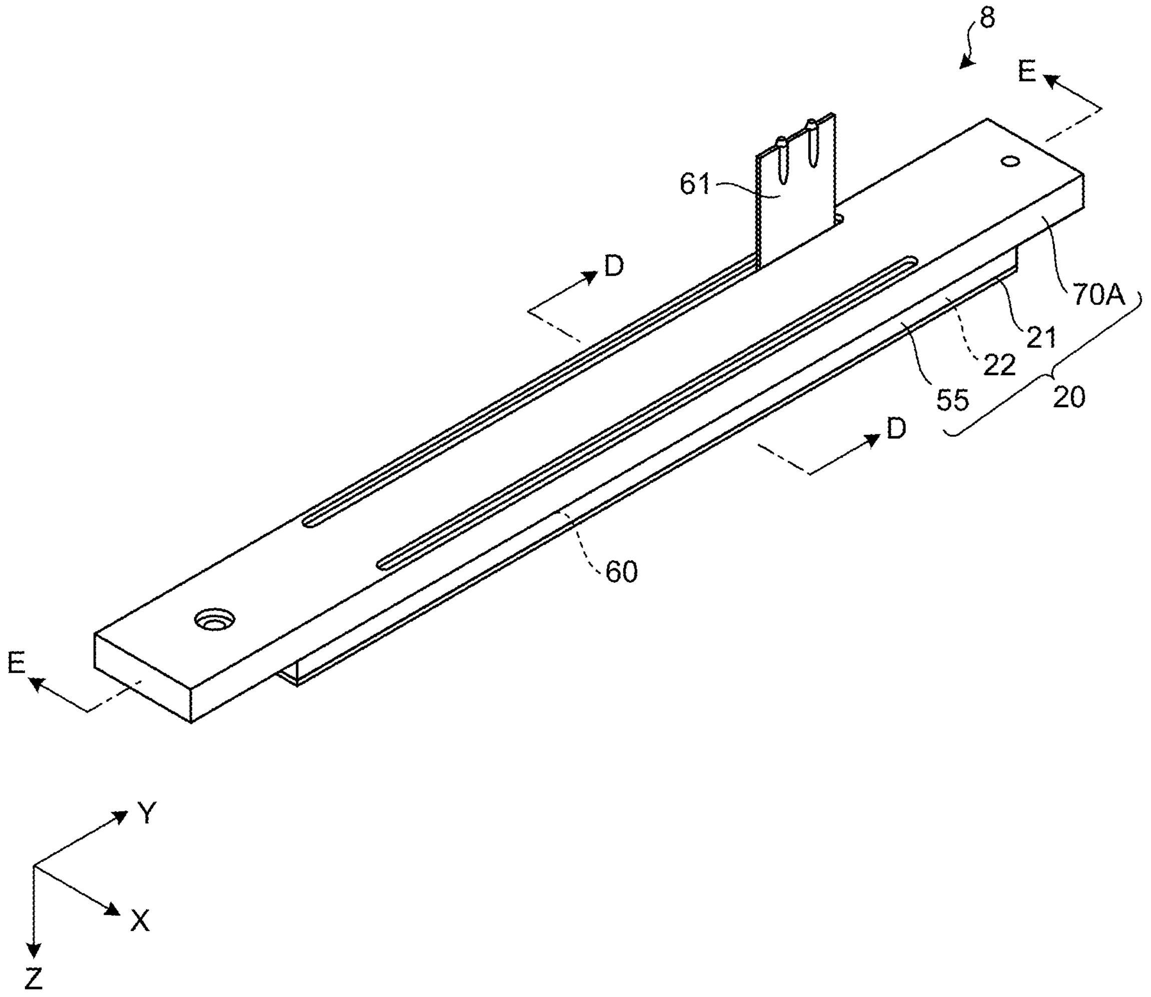
FIG. 14 is a perspective view that illustrates a configuration of an essential part of a liquid discharge head according to a second embodiment.

Next, a configuration of a liquid discharge head 8 according to a second embodiment will be explained with reference to FIG. 13 to FIG. 16. FIG. 13 is an exploded perspective view that illustrates a schematic configuration of the liquid discharge head 8 according to a second embodiment and FIG. 14 is a perspective view that illustrates a configuration of an essential part of the liquid discharge head 8 according to a second embodiment. Furthermore, FIG. 15 is a cross-sectional view along line D-D as illustrated in FIG. 14 and FIG. 16 is an enlarged cross-sectional view along line E-E as illustrated in FIG. 14.

As illustrated in FIG. 13 and FIG. 14, the liquid discharge head 8 includes a head body 20, a wiring part 40, a cover member 50, and a heater 60. The head body 20 includes a flow channel member 21, a piezoelectric actuator substrate 22, a branched flow channel member 55, and a reservoir 70A. The reservoir 70A and the branched flow channel member 55 correspond to, for example, the reservoir according to a first embodiment (see, for example, FIG. 3, FIG. 4, and the like).

Figure 15:
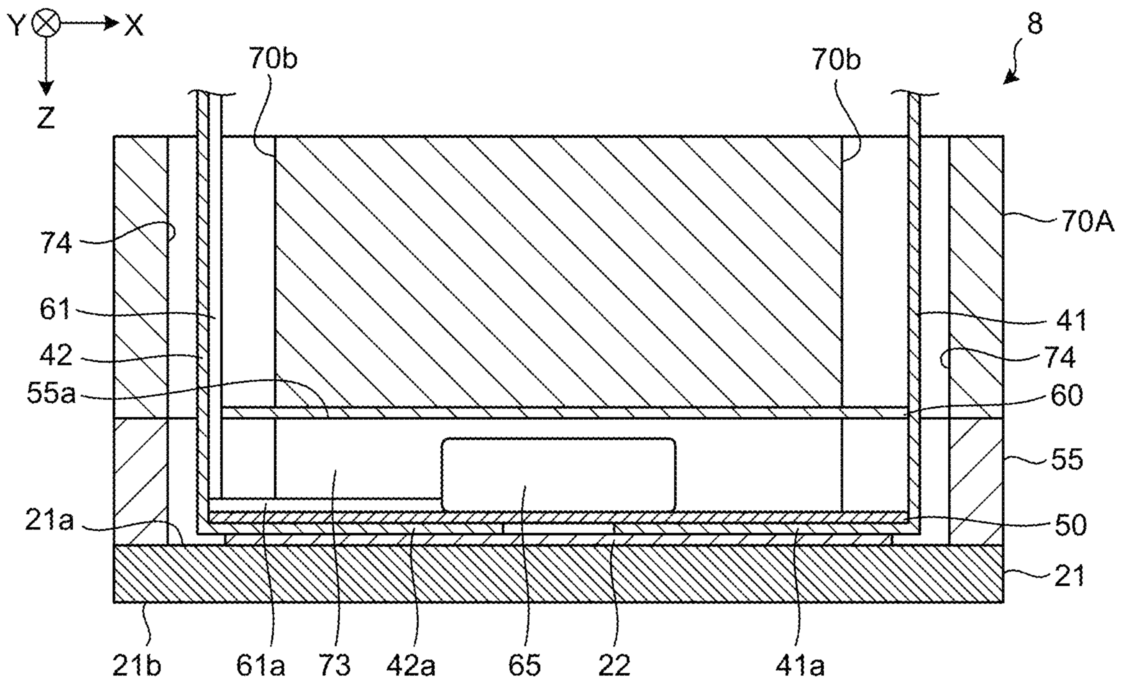
FIG. 15 is a cross-sectional view along line D-D as illustrated in FIG. 14.
Figure 16:
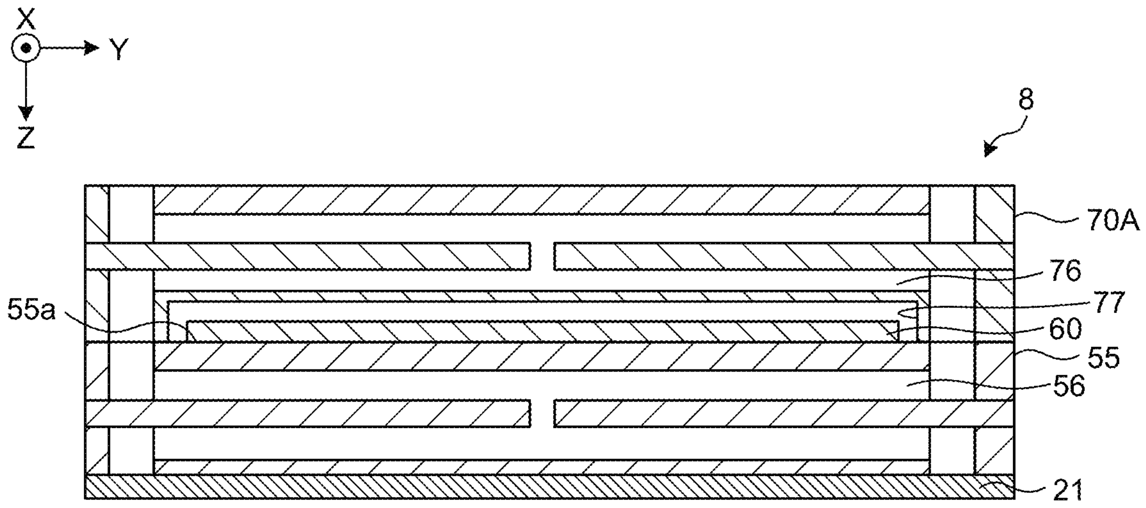
FIG. 16 is a cross-sectional view along line E-E as illustrated in FIG. 14.

Furthermore, as illustrated in FIG. 15 and FIG. 16, the heater 60 is positioned on the branched flow channel member 55. Specifically, the heater 60 is fixed on a first surface 55*a* that is an upper surface of the branched flow channel member 55. Furthermore, a recessed part 77 is positioned on the reservoir 70A that faces the first surface 55*a* and the heater 60 is housed in a space between the first surface 55*a* and the recessed part 77.

Thus, the heater 60 is positioned on the branched flow channel member 55, so that it is possible to improve a heat uniformity of a liquid that is positioned inside the liquid discharge head 8. Furthermore, it is possible to elevate a temperature of a liquid in the branched flow channel member 55 and the reservoir 70A immediately.

The heater 60 faces a branched flow channel 56 that is positioned inside the branched flow channel member 55. In other words, the heater 60 faces a partition wall that composes the branched flow channel 56 of the branched flow channel member 55. Thereby, it is possible to efficiently elevate a temperature of a liquid that flows through the branched flow channel 56.

Furthermore, the heater 60 faces a supply flow channel 76 that is positioned inside the reservoir 70A. In other words, the heater 60 faces a separation wall that composes the supply flow channel 76 of the reservoir 70A. Thereby, it is possible to efficiently elevate a temperature of a liquid that flows through the supply flow channel 76.

The liquid discharge head 8 has a configuration where the heater 60 faces the branched flow channel 56 that is positioned inside the branched flow channel member 55 and the heater 60 faces the supply flow channel 76 that is positioned inside the reservoir 70A. Hence, it is possible to efficiently elevate a temperature of a liquid that is supplied to the liquid discharge head 8.

Additionally, although FIG. 16 explains the heater 60 that is positioned between the reservoir 70A and the branched flow channel member 55, this is not limiting. The heater 60 may face, for example, the supply flow channel 76 that is positioned inside the reservoir 70A and/or the branched flow channel 56 that is positioned inside the branched flow channel member 55. Thereby, it is possible for the heater 60 to directly heat a liquid that flows through the supply flow channel 76 and/or the branched flow channel 56. Hence, it is possible to further improve a heat uniformity of a liquid that is positioned inside the liquid discharge head 8. Furthermore, it is possible to elevate a temperature of a liquid in the supply flow channel 76 and/or the branched flow channel 56 more immediately.

Although each embodiment of the present invention has been explained above, the present invention is not limited to an embodiment(s) as described above and a variety of modifications are possible without departing from an essence thereof. For example, although an example where the flow channel member 21 is composed of a plurality of laminated plates has been illustrated in an embodiment as described above, the flow channel member 21 is not limited to a case where it is composed of a plurality of laminated plates.

For example, the flow channel member 21 may be configured in such a manner that the supply manifold(s) 161, the separate flow channel 164, and/or the like is/are formed by an etching process.

As provided above, a liquid discharge head 8 according to an embodiment includes a flow channel member 21, a pressurization part (a displacement element 170), a plurality of discharge holes 163, a flexible substrate 41, 42, a cover member 50, and a heater 60. The flow channel member 21 has a first surface 21*a* and a second surface 21*b* that is positioned on an opposite side of the first surface 21*a*. The pressurization part (the displacement element 170) is positioned on the first surface 21*a*. The plurality of discharge holes 163 are positioned on the second surface 21*b*. For the flexible substrate 41, 42, a one-end part 41*a*, 42*a* thereof that is positioned on the pressurization part (the displacement element 170) is electrically connected to the pressurization part (the displacement element 170). The cover member 50 covers the one-end part 41*a*, 42*a* of the flexible substrate 41, 42. The heater 60 is positioned on the cover member 50. Hence, it is possible to transfer heat from a heater 60 efficiently.

Furthermore, the liquid discharge head 8 according to an embodiment may include a supply member (a reservoir 70), and a heater wiring 61. The supply member (the reservoir 70) has a housing part 73 and a slit 70*b*, and is linked to the flow channel member 21. The housing part 73 houses the pressurization part (the displacement element 170), the one-end part 41*a*, 42*a*, the cover member and the heater 60 between it and the first surface 21*a*. The slit 70*b* is communicated with the housing part 73. The heater wiring 61 is electrically connected to the heater 60. The flexible substrate 41, 42 and the heater wiring 61 are led from the slit 70*b* to an outside of the supply member (the reservoir 70). Thereby, arrangement of a flexible substrate 41, 42 and/or a heater wiring 61 is facilitated.

Furthermore, in the liquid discharge head 8 according to an embodiment, the flexible substrate 41, 42 may be led from the slit 70*b* so as to be positioned outside the heater wiring 61. Thereby, workability of leading of a heater wiring 61 from a slit 70*b* is improved.

Furthermore, the liquid discharge head 8 according to an embodiment may further includes a heater 63 that is positioned on the supply member (the reservoir 70). Thereby, it is possible to improve a heat uniformity of a liquid that is positioned inside a liquid discharge head 8. Furthermore, it is possible to elevate a temperature of a liquid in a supply member (a reservoir 70) immediately.

Furthermore, in the liquid discharge head 8 according to an embodiment, the cover member 50 may contact the flow channel member 21 at an end part of the cover member 50 in a length direction thereof, and flow channels that are respectively possessed by the supply member (the reservoir 70) and the flow channel member 21 may be connected at an end part of the flow channel member 21 in a length direction thereof. Thereby, it is possible to immediately elevate a temperature of a liquid that is positioned in a neighborhood of a part (an opening 161*a*) where a flow of such a liquid is concentrated.

Furthermore, in the liquid discharge head 8 according to an embodiment, the cover member 50 may contact the flow channel member 21 inside a position (an opening 161*a*) where flow channels that are respectively possessed by the supply member (the reservoir 70) and the flow channel member 21 are connected. Thereby, it is possible to immediately elevate a temperature of a liquid that is supplied from a supply member (a reservoir 70) to a flow channel member 21.

Furthermore, the liquid discharge head 8 according to an embodiment may further includes a heat conduction sheet 66 that is positioned between the heater and the supply member (the reservoir 70). Thereby, it is possible to improve a heat uniformity of a liquid that is positioned inside a liquid discharge head 8.

Furthermore, it is possible to elevate a temperature of a liquid in a supply member (a reservoir 70) immediately.

Furthermore, in the liquid discharge head 8 according to an embodiment, the cover member 50 may be fixed on the flexible substrate 41, 42. Thereby, an adhesion property between a cover member 50 and a flexible substrate 41, 42 is improved, so that a heat conductivity from a heater 60 to a flow channel member 21 is improved.

Furthermore, in the liquid discharge head 8 according to an embodiment, the cover member 50 may be fixed on the flow channel member 21. Thereby, an adhesion property between a cover member 50 and a flow channel member 21 is improved, so that a heat conductivity from a heater 60 to such a flow channel member 21 is improved.

Furthermore, a liquid discharge head 8 according to an embodiment includes a flow channel member 21, a pressurization part (a displacement element 170), a plurality of discharge holes 163, a branched flow channel member 55, a heater 60, and a supply member (a reservoir 70A). The flow channel member 21 has a first surface 21*a* and a second surface 21*b* that is positioned on an opposite side of the first surface 21*a*. The pressurization part (the displacement element 170) is positioned on the first surface 21*a*. The plurality of discharge holes 163 are positioned on the second surface 21*b*. The branched flow channel member 55 is positioned on the flow channel member 21 and is linked to the flow channel member 21. The heater is positioned on the branched flow channel member 55. The supply member (the reservoir 70A) is positioned on the branched flow channel member 55 and the heater 60 and is linked to the branched flow channel member 55. Thereby, it is possible to improve a heat uniformity of a liquid that is positioned inside a liquid discharge head 8.

Furthermore, it is possible to elevate a temperature of a liquid in a branched flow channel member 55 and a supply member (a reservoir 70A) immediately.

Furthermore, the branched flow channel member 55 according to an embodiment may have a branched flow channel 56 in an inside thereof, and the heater 60 may face the branched flow channel 56. Thereby, it is possible to elevate a temperature of a liquid in a branched flow channel 56 more immediately.

Furthermore, the supply member (the reservoir according to an embodiment may have a supply flow channel 76 in an inside thereof, and the heater 60 may face the supply flow channel 76. Thereby, it is possible to elevate a temperature of a liquid in a supply flow channel 76 more immediately.

It is possible for a person(s) skilled in the art to readily derive an additional effect(s) and/or variation(s). Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

The invention claimed is:

1. A liquid discharge head, comprising:

a flow channel member that includes a first surface and a second surface that is positioned on an opposite side of the first surface;

a pressurization part that is positioned on the first surface;

a plurality of discharge holes that are positioned on the second surface;

a flexible substrate, the flexible substrate including a one-end part that is positioned on and electrically connected to the pressurization part;

a cover member that covers the one-end part;

a first heater that is positioned on the cover member; and a supply member that is linked to the flow channel member, the supply member being positioned on the first surface of the flow channel member.

2. The liquid discharge head according to claim 1, further comprising:

the supply member including a housing part that houses the pressurization part, the one-end part, the cover member, and the first heater between the supply member and the first surface and a slit that is communicated with the housing part; and a first heater wiring that is electrically connected to the first heater, wherein the flexible substrate and the first heater wiring are led from the slit to an outside of the supply member.

3. The liquid discharge head according to claim 2, wherein the flexible substrate is led from the slit to be positioned outside the first heater wiring.

4. The liquid discharge head according to claim 2, further comprising a second heater that is positioned on the supply member.

5. The liquid discharge head according to claim 4, further comprising a heat conduction sheet that is positioned between the second heater and the supply member.

6. The liquid discharge head according to claim 2, wherein the cover member contacts the flow channel member at an end part of the cover member in a length direction thereof; and flow channels that are respectively possessed by the supply member and the flow channel member are connected at an end part of the flow channel member in a length direction thereof.

7. The liquid discharge head according to claim 2, wherein the cover member contacts the flow channel member inside a position where flow channels that are respectively possessed by the supply member and the flow channel member are connected.

8. The liquid discharge head according to claim 1, wherein the cover member is fixed on the flexible substrate.

9. The liquid discharge head according to claim 1, wherein the cover member is fixed on the flow channel member.

10. A recording device, comprising:

the liquid discharge head according to claim 1; and a conveyance part that conveys a recording medium to the liquid discharge head.

11. A recording device, comprising:

the liquid discharge head according to claim 1; and an applicator that applies a coating agent to a recording medium.

12. A recording device, comprising:

the liquid discharge head according to claim 1; and a dryer that dries a recording medium.

* * * * *